(12) United States Patent
Lukongwa

(10) Patent No.: US 9,937,401 B2
(45) Date of Patent: Apr. 10, 2018

(54) SIMULATED DRIBBLEFIELD

(71) Applicant: Tonny Lukongwa, Everett, WA (US)

(72) Inventor: Tonny Lukongwa, Everett, WA (US)

( * ) Notice: Subject to any disclaimer, the term of this patent is extended or adjusted under 35 U.S.C. 154(b) by 0 days.

(21) Appl. No.: 14/700,256

(22) Filed: Apr. 30, 2015

(65) Prior Publication Data

US 2016/0317890 A1    Nov. 3, 2016

(51) Int. Cl.
*A63B 69/00* (2006.01)
*G09B 19/00* (2006.01)
*A63B 24/00* (2006.01)

(52) U.S. Cl.
CPC ........ *A63B 69/002* (2013.01); *G09B 19/0038* (2013.01); *A63B 69/0071* (2013.01); *A63B 2024/0056* (2013.01); *A63B 2208/0204* (2013.01); *A63B 2243/007* (2013.01); *A63B 2243/0066* (2013.01)

(58) Field of Classification Search
CPC . A63B 69/0026; A63B 63/00; A63B 69/0002; A63B 69/38; A63B 69/002; A63B 69/345; A63B 2243/007; A63B 69/0028; A63B 67/002; A63B 67/004; A63B 2243/0066; A63B 69/0071; A63B 2208/0204
USPC ....... 473/446, 422, 440, 438, 445, 465, 470, 473/471, 478, 477, 447
See application file for complete search history.

(56) References Cited

U.S. PATENT DOCUMENTS

| | | | | |
|---|---|---|---|---|
| 2,183,465 A * | 12/1939 | Noor | ..................... | A63B 69/345 473/443 |
| 2,532,880 A * | 12/1950 | Banbury | .............. | A63B 69/345 473/443 |
| 2,752,155 A * | 6/1956 | Nedwick | .............. | A63B 69/345 473/440 |
| 3,304,089 A * | 2/1967 | Smith | .................. | A63B 69/345 473/440 |
| 3,399,891 A * | 9/1968 | McCormick | ......... | A63B 69/345 473/442 |
| 3,424,458 A * | 1/1969 | Hopps, Jr. | ............ | A63B 69/345 473/443 |
| 3,578,323 A * | 5/1971 | Coleman | ................ | A63B 69/00 473/438 |
| 3,659,848 A * | 5/1972 | DePew | ................ | A63B 69/345 473/443 |
| 3,709,489 A * | 1/1973 | Holleran | ................ | A63B 69/00 473/446 |
| 4,645,210 A * | 2/1987 | Patsy | ..................... | A63B 63/06 473/446 |
| 5,485,993 A * | 1/1996 | Lipsett | ............... | A63B 69/0071 473/448 |

(Continued)

*Primary Examiner* — Mitra Aryanpour
(74) *Attorney, Agent, or Firm* — Daniel M. Cohn; Howard M. Cohn

(57) ABSTRACT

An dribblefield simulator improves a dribbler's dribbling skills where the invention simulates a partition of a game dribblefield where dynamic negative space exists between players. The dribblefield simulator can be a moving unit mounted on a fixed chassis with a plurality of dribblefield limiting parts mounted on the fixed chassis and a plurality of dribblefield limiting parts mounted on the moving unit. The chassis can also be a moving chassis. An optional dynamic feedback control system can be mounted on either the fixed or moving chassis that can receive signals from a game projectile and from a dribbler and control the moving units. Multiple moving units can be mounted on either the fixed chassis or the moving chassis.

7 Claims, 3 Drawing Sheets

(56) References Cited

U.S. PATENT DOCUMENTS

| | | | | | |
|---|---|---|---|---|---|
| 5,498,000 | A * | 3/1996 | Cuneo | A63B 63/06 | 473/446 |
| 5,769,742 | A * | 6/1998 | Bristow | A63B 69/34 | 473/446 |
| 5,800,291 | A * | 9/1998 | Grover | A63B 69/0071 | 473/422 |
| 5,842,954 | A * | 12/1998 | Slupskiy | A63B 5/16 | 473/440 |
| 5,928,093 | A * | 7/1999 | Lai | A63B 69/34 | 473/430 |
| 6,053,824 | A * | 4/2000 | Boudreaux | A63B 9/00 | 473/440 |
| 6,261,195 | B1 * | 7/2001 | Shingleton | A63B 69/345 | 473/438 |
| 6,530,867 | B2 * | 3/2003 | Schwendemann | A63B 69/004 | 482/83 |
| 6,569,041 | B1 * | 5/2003 | Riivald | A63B 69/0026 | 473/423 |
| 7,578,757 | B1 * | 8/2009 | McNary | A63B 69/0026 | 473/446 |
| 7,658,699 | B1 * | 2/2010 | Johnson, Jr. | A63B 69/201 | 482/83 |
| 7,736,248 | B2 * | 6/2010 | Eldridge | A63B 69/004 | 473/443 |
| 9,199,150 | B2 * | 12/2015 | Wackerly | A63B 69/0071 | 473/447 |
| 2002/0187862 | A1 * | 12/2002 | Benoit | A63B 69/00 | 473/472 |
| 2008/0287224 | A1 * | 11/2008 | Salvador | A63B 69/0024 | 473/446 |
| 2009/0291781 | A1 * | 11/2009 | Caruso | A63B 69/002 | 473/444 |
| 2010/0160093 | A1 * | 6/2010 | MacArthur | A63B 69/0071 | 473/447 |
| 2010/0331123 | A1 * | 12/2010 | Cobham | A63B 69/0026 | 473/446 |
| 2012/0094788 | A1 * | 4/2012 | Hartigan | A63B 69/002 | 473/445 |

* cited by examiner

SIMULATED DRIBBLEFIELD

CROSS-REFERENCE TO RELATED APPLICATIONS

Not applicable

STATEMENT REGARDING FEDERALLY SPONSORED RESEARCH OR DEVELOPMENT (IF APPLICABLE)

Not applicable

REFERENCE TO SEQUENCE LISTING, A TABLE, OR A COMPUTER PROGRAM LISTING COMPACT DISC APPENDIX (IF APPLICABLE)

Not applicable

BACKGROUND OF THE INVENTION

The simulated dribblefield is a training device, a partial-game simulator embodied in the negative space through a structure, for games that are played on a field with a projectile where the invention is concerned with simulating subparts of the field defined as the dribblefield. The invention has convertible elements that change with type of projectile and associated subfield being used, examples being but not limited to whether the field is a soccer field, basketball court, rugby field or American football field. Example of dribbling is done with a soccer ball, a basketball, a rugby ball or an American football.

GLOSSARY

Dribblefield: the variable field or the partition of the field in a game in which a player who is in control of the projectile, the dribbler, moves with the projectile.

Simulated dribblefield: the variable field or the partition of the field in which a player who is in control of the projectile, the dribbler, moves with the projectile inside of the negative space of a chassis that contains dribblefield limiting parts that simulate opposing players and teammates in game conditions.

Dribblefield limiting parts: parts that simulated opposing players and teammates in game conditions. The Dribblefield limiting parts may be customized to fit particular games such as parts in the shape of human legs for a soccer training device.

Dynamic feedback control system: Interacts with the components of the simulated dribblefield to train the dribbler to respond to the current dribblefield and an anticipated dribblefield to train the dribbler to work towards strategic partitioning of dribblefield.

BRIEF SUMMARY OF THE INVENTION

The simulated dribblefield is the negative space inside a fixed or moving chassis, with moving parts and optional sensors and that enable student athletes, amateur athletes and professional athletes to practice dribbling skills while maintaining control of a projectile (ball). Optional sensors allow interaction using a dynamic feedback control system between the game strategy, the player, the moving parts inside the chassis, and the movement of the chassis.

In most sports such as soccer, football, rugby and basketball, the opponents are not stationary but dynamic and move to intercept the dribbler with the purpose to extract the projectile. As opponents attack and shrink the available dribblefield, the dribbler must be able to control the projectile at all times in the current dribblefield and anticipate how to and accomplish controlling the projectile in the future partitions of the dribblefield. A dribbler armed with critical dribbling skills will succeed in controlling the projectile past a well-organized team of defensive opponents. Therefore learning dribbling skills is essential to being a successful athlete at sports such as but not limited to soccer, America football, rugby and basketball.

The simulated dribblefield has a dynamic dribblefield that changes shape and size via dynamic dribblefield limiting parts. The dribbler has the challenge to dribble with the projectile though the current dribblefield while anticipating the next dribblefield similar to sports such as but not limited to soccer, American Football and Rugby. The simulated dribblefield mimics the dynamic negative spaces that result from attacking opponents surrounding a dribbler with the projectile and is a closer representation that mimics dribbler and opponent sports activity compared to prior art because with prior art such as cones (14), the cones remain stationary on the ground and only the dribbler dribbles past the stationary objects.

This specification describes two of the embodiments of the simulated dribblefield but the simulated dribblefield is not limited by the examples given herein.

A first embodiment is the fixed chassis in which the supporting structure chassis is kept fixed on the ground but moving dribblefield limiting parts vary the size and shape of the dribblefield through which the dribbler has to pass. The dribbler is challenged to find a path to maneuver through the dynamic dribblefield limiting parts moved within the simulated dribblefield (FIG. 2).

The second embodiment is a moving chassis where the entire chassis structure assembly moves on wheels towards the dribbler. As the moving chassis moves towards the dribbler, the size of dribblefield within the structure is varied by dynamic feedback control system. The dribbler is challenged with the task to find the dribblefield in which to maneuver. FIG. 2 & FIG. 3 shows the moving chassis applied to soccer. FIG. 4 shows the moving chassis applied to American football.

DETAILED DESCRIPTION OF INVENTION

Figure 2:
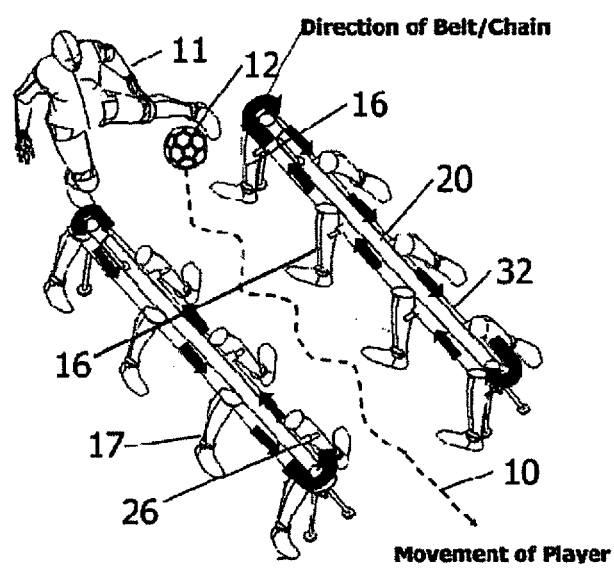

A simulated dribblefield (10) improves a dribbler's dribbling skills where the dribblefield (10) simulates a partition of a game dribblefield. A moving unit (32) is mounted on a fixed chassis (20) (see FIG. 2) with a plurality of dribblefield limiting parts (16) mounted on the fixed chassis (20) and an optional plurality of dribblefield limiting parts (16) mounted on the moving unit (32). The chassis can also be a moving chassis (30). An optional dynamic feedback control system (26) can be mounted on the fixed chassis (20) to control the moving unit (32) that can receive signals from a game projectile (12) and from a dribbler (11). Multiple moving units can be mounted on either the fixed chassis or the moving chassis.

The fixed chassis (20) is stationary on the ground and provides support for the moving unit (32). See FIG. 2. The moving unit (32) is powered by a motor or other means. The moving unit (32) moves by means such but not limited to chain/timing belts or cables. The moving unit (32) carries a plurality of dribblefield limiting parts (16) such as simulated limbs (17) that may be attached to the moving chain/belts by attachment pins and lugs. The dribblefield limiting parts (16) are located in along the chain/belts at sequential distances. The sprocket or gears may move the chain/belts that carry dribblefield limiting parts (16). The fixed chassis (20) and the moving unit (32) make up an assembly.

An example of utilization of the fixed chassis (20) may be where the straight path through the left assembly and the right assembly is partially obstructed by dribblefield limiting parts (16) that move towards the dribbler (11). The dribbler's (11) challenge is to dribble through the simulated dribblefield (10) past the dribblefield limiting parts (16) on both the left assembly and the right assembly until the end of the assembly. In the process, the dribbler (11) moves left and right in a curved or zigzag manner similar to a dribbler dribbling past opponents in a sports game. When the one dribbler (11) is done dribbling to the end of the assembly, the dribbler can repeat the process or other user can begin the process of the first user. This equipment is designed for use by multiple dribblers in a training drill.

The fixed chassis can be a used with basic utility or an advanced utility depending on the whether the dribblefield limiting parts (16) have secondary motion that is independent of primary chassis motion. With basic utility, the dribblefield limiting parts (16) do not change locations on the chain/belts. The dribblefield limiting parts (16) do not move because they are fixed in position on chain/belt. The dribblefield limiting parts (16) do not respond to the motion of the dribbler (11). On the other hand with advanced utility, the dribblefield limiting parts (16) change locations relative to the moving unit (32). The advanced utility is accomplished by a sensory controller (22) that monitors the location and movement of a sensor in the projectile (12) or dribbler's gear and activate the actuators that vary the position of the dribblefield limiting parts (16) on the belt.

An example of advanced utility is a primary motion of the belt/chain with an actuator secondary motion independent of the primary motion. The secondary motion provides extra degrees of freedom of motion intended to further shrink possible dribblefields (10) not blocked by the primary motion thus improve the probability of interception of the projectiles (12) and make utilization more interactive compared to primary utilization. The secondary improves realism to sports such as soccer where the opponent who although might attack dribbler (11) with primary direction can quickly change directions to block the dribblefield (10).

Figure 3:
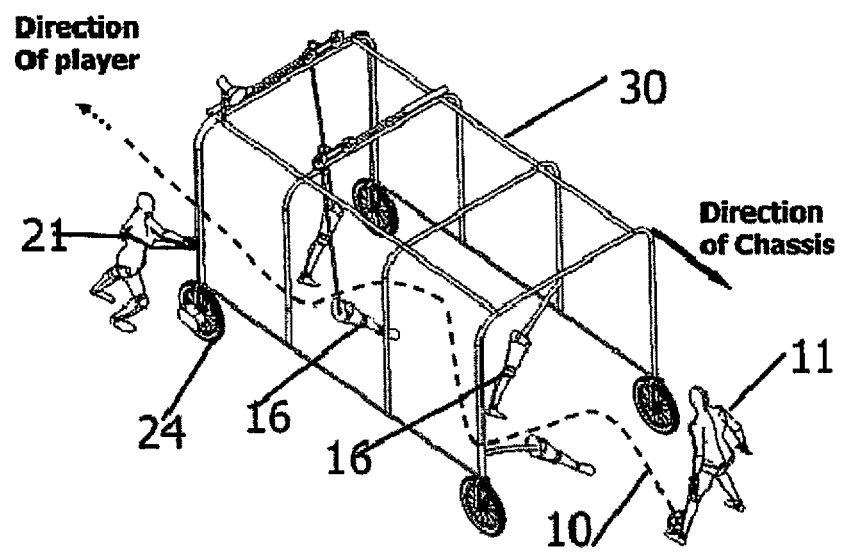
Figure 4:
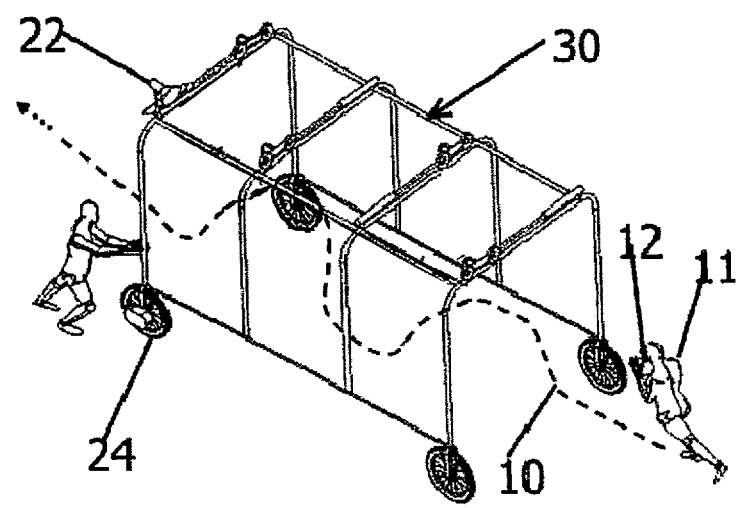

The moving chassis (30) (FIG. 3, FIG. 4) has a chassis on wheels (24) that supports the entire structure. The chassis is powered by a motor or human (21) and moves towards the dribbler (11) with the projectile (12).

Figure 1:
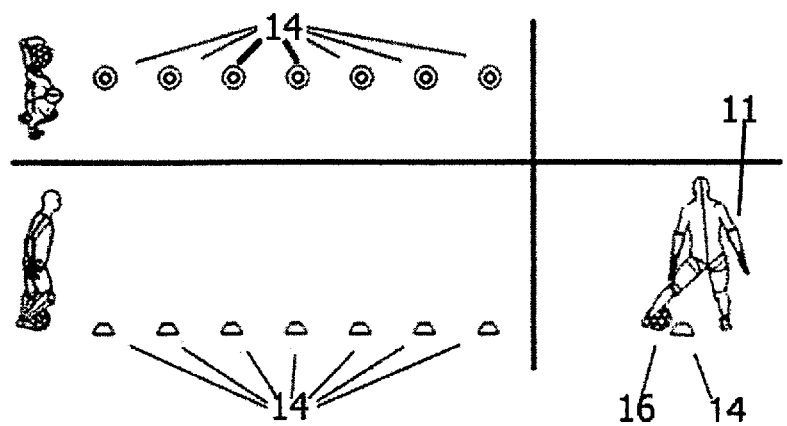
FIG. 1 Traditional prior art for practicing soccer dribbling
FIG. 2 Fixed chassis utilized for soccer
FIG. 3 Moving chassis showing zigzag direction of soccer dribbler
FIG. 4 Moving chassis showing zigzag direction of football dribbler
FIG. 5 Moving chassis showing multiple dribblers

Examples of use are when the dribbler (11) dribbles in a curved or zigzag-path through the tight dribblefield (10) past the dynamic dribblefield limiting parts (16). The dribbler (11) is faced with a challenge to dribble though dynamic tight dribblefield (10) that mimics sports such as soccer where the opponents attack and block the dribbler (11) to extract the projectile (12). On the other hand, with traditional prior art (FIG. 1), the dribblers practice with stationary cones (14) or other stationary objects that are placed in line or patterns and only dribbler (11) moves with the projectile (12) towards the stationary elements (14).

The moving chassis can be a used with basic utility or an advanced utility with examples as described with the fixed chassis.

With advanced utilization, the dribblefield limiting parts (16) have secondary motion relative to the chassis. The secondary motion of dribblefield limiting parts (16) is achieved through an automated actuation system that responses to stimuli (sensor in projectile or on dribbler's gear) locations relative to the chassis while the chassis is in motion. The sensory controller (22) monitors the location and movement of sensor in projectile or dribbler gear and activates the actuators that move the dribblefield limiting parts (16) to vary the dribblefield (10) relative to the chassis. The advanced utility has two motions; first is the primary motion of the chassis frame and second is the actuator secondary motion that moves the dribblefield limiting parts relative to the chassis independently of the primary motion. The secondary motion provides extra degrees of freedom of motion intended to further shrink possible escape dribblefields (10) not blocked by the primary motion thus improve the probability of interception of the projectiles (12) and make utilization more interactive compared to primary utilization. The secondary improves realism to sports such as soccer where the opponent who although might attack dribbler with primary direction can quickly change directions to block the dribbler escape.

Figure 5:
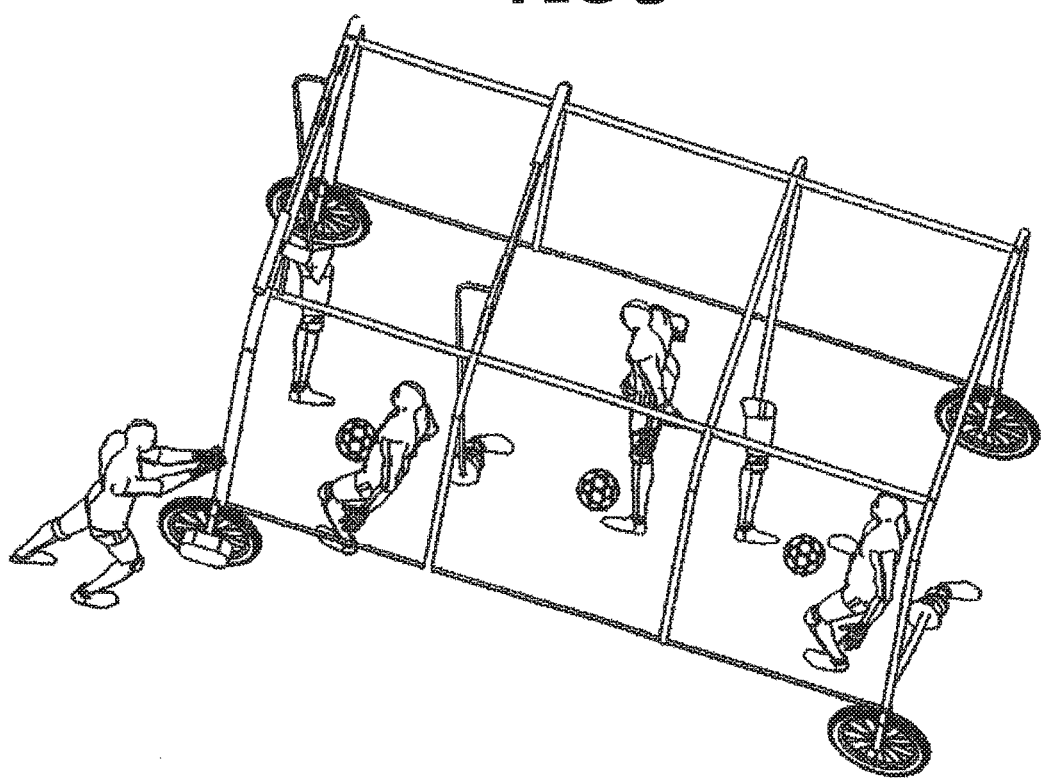

Multiple dribblers can utilize the dribblefield at the same time. See FIG. 5.

The invention claimed is:

1. A simulated dribblefield, comprising:
   a first fixed chassis and a second fixed chassis independent of each other positioned on a playing surface;
   the first fixed chassis and the second fixed chassis disposed in spaced relationship to each other to form a path;
   a first moving unit powered by a first motor mounted to the first fixed chassis for moving the first moving unit about the first chassis and a second moving unit powered by a second motor mounted to the second fixed chassis for moving the second moving unit about the second chassis; and
   a first plurality of dribblefield limiting parts attached to the first moving unit at sequential distances for movement about the first chassis and a second plurality of dribblefield limiting parts attached to the second moving unit at sequential distances for movement about the second chassis wherein the first and second limiting parts form an obstacle for a game projectile to pass therethrough.

2. The simulated dribblefield of claim 1 wherein the first plurality of dribblefield limiting parts is attached to a first moving belt powered by the first motor being secured to the first fixed chassis and the second plurality of dribblefield limiting parts is attached to a second moving belt powered by the second motor being secured to the second fixed chassis.

3. The simulated dribblefield of claim 2 wherein the first plurality of dribblefield limiting parts are attached to the first moving belt at fixed sequential distances and the second plurality of dribblefield limiting parts are attached to the second moving belt at fixed sequential distances.

4. The simulated dribblefield of claim 2 wherein:
the first plurality of dribblefield limiting parts change location relative to the movement of the first moving belt about the first chassis; and
the second plurality of dribblefield limiting parts change location relative to the movement of the second moving belt about the second fixed chassis.

5. The simulated dribblefield of claim 1 wherein the first fixed chassis and the second fixed chassis are each fixed and adapted to be stationary on the playing surface.

6. The simulated dribblefield of claim 1 wherein the first and second plurality of dribblefield limiting parts are in the shape of human legs.

7. The simulated dribblefield of claim 1 wherein the game projectile is a ball.

* * * * *